Figure 1:
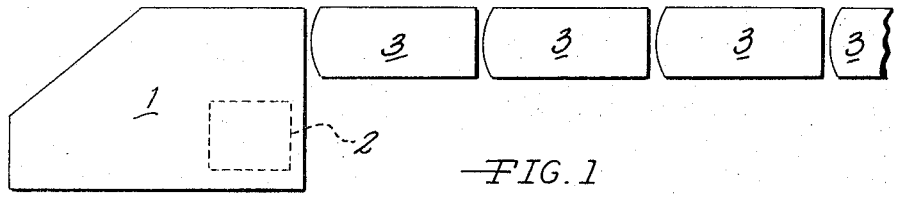

Feb. 28, 1967    A. WRIEDT    3,306,477
TRUCK TRAIN
Filed July 21, 1964    3 Sheets-Sheet 1

INVENTOR
ALFRED WRIEDT

BY *Beaman & Beaman*

ATTORNEYS

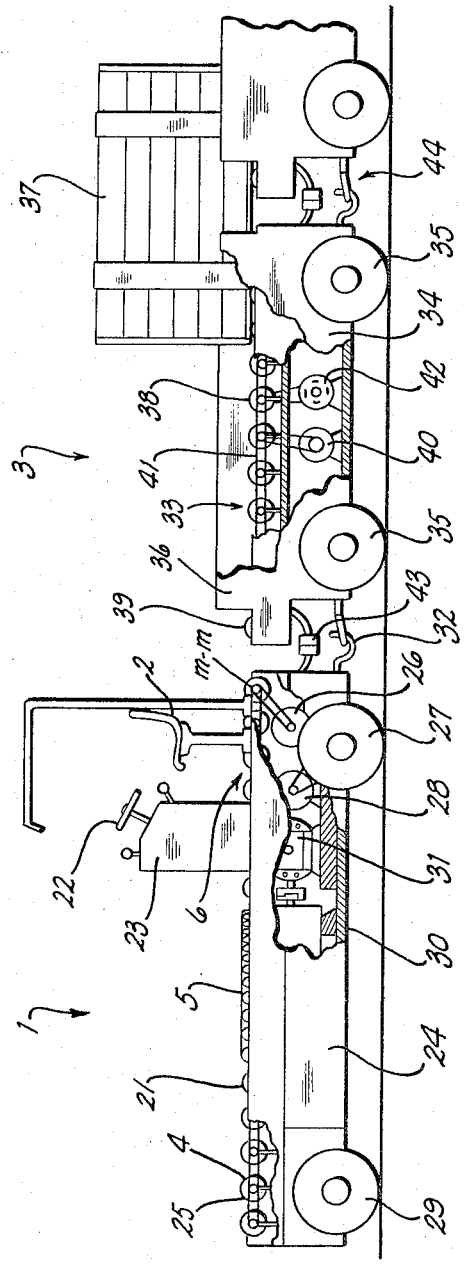

United States Patent Office 3,306,477
Patented Feb. 28, 1967

3,306,477
TRUCK TRAIN
Alfred Wriedt, Beckersbergring 107, Ulzburg, Germany
Filed July 21, 1964, Ser. No. 384,158
Claims priority, application Germany, July 23, 1963,
W 34,939
4 Claims. (Cl. 214—38)

The invention relates to a truck train and more particularly to a truck train for the transportation of carloads in traffic stations.

In traffic stations, e.g. in railroad stations or airports, a great number of carloads such as parcels, tote boxes, suitcases, and the like are to be transported between various places. Generally the goods are taken over by a truck train with the carloads being placed in the individual trucks of said train by hand in a time-consuming and troublesome manner, and from which they have to be unloaded in an even more troublesome operation since normally the goods are placed side by side and on top of one another in a random manner.

Therefore, it is an object of the invention to overcome these difficulties by providing a truck train which ensures safe and quick loading and unloading of the goods or carloads.

According to the invention the loading surfaces of the drive vehicle and of the trailer carriages of the truck train are provided with conveying means which may be driven independently of the movement of the truck train. More particularly, the invention provides a truck train in which the conveying loading surface of each individual truck is cooperating with the loading surface of the adjacent truck to form a movable, continuous conveying path onto which loads may be placed at any point and conveyed to and fro ad libitum. It is thus possible to charge loads onto the conveying path, move them to and fro thereon, store them thereon and transport them from one transit place to another. The truck train thus forms a conveying means as well as a transport means. Preferably the goods are loaded near one end of the train and conveyed towards the other end where they are closely shoved together in a space economizing manner.

In a preferred embodiment of the invention, the conveying means of the loading surfaces is a roller path of driven rollers. In order to obtain a most economical transverse arrangement of the goods to be conveyed, the drive vehicle preferably possesses several different rollers, a first group of these rollers consisting of rollers arranged in parallel with respect to each other, and adjacent second group consisting of conical rollers arranged arcuately in a fan-like pattern, and a third group forming the beginning of the actual roller path and consisting of rollers arranged in parallel with each other. When loading the goods to be conveyed in a longitudinal arrangement, the third group of rollers receives the goods via the arcuate roller path in cooperation with a baffle in such a manner that the goods are turned to a somewhat oblique position; on their subsequent abutment against a barrier at the end of the truck train or aaginst the preceding carload, the goods will then be brought into a transverse position. In order to avoid that halted carloads are subject to excessive wear by still rotating rollers, each roller is preferably driven via an overload clutch which is adjusted to disengage if the transmitted torque exceeds a predetermined value.

Figure 3:
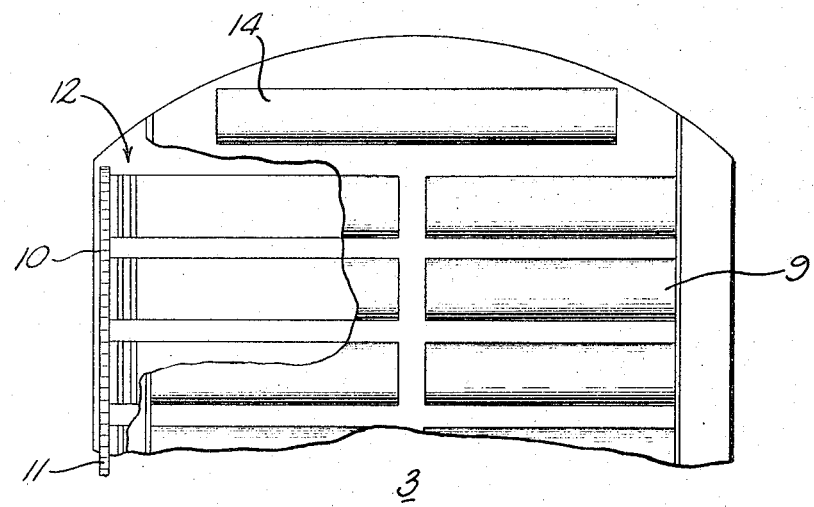
Figure 3:
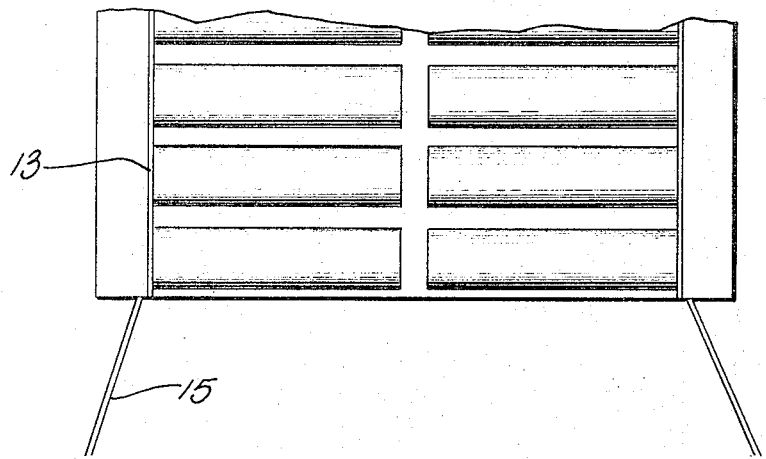
Figure 2:
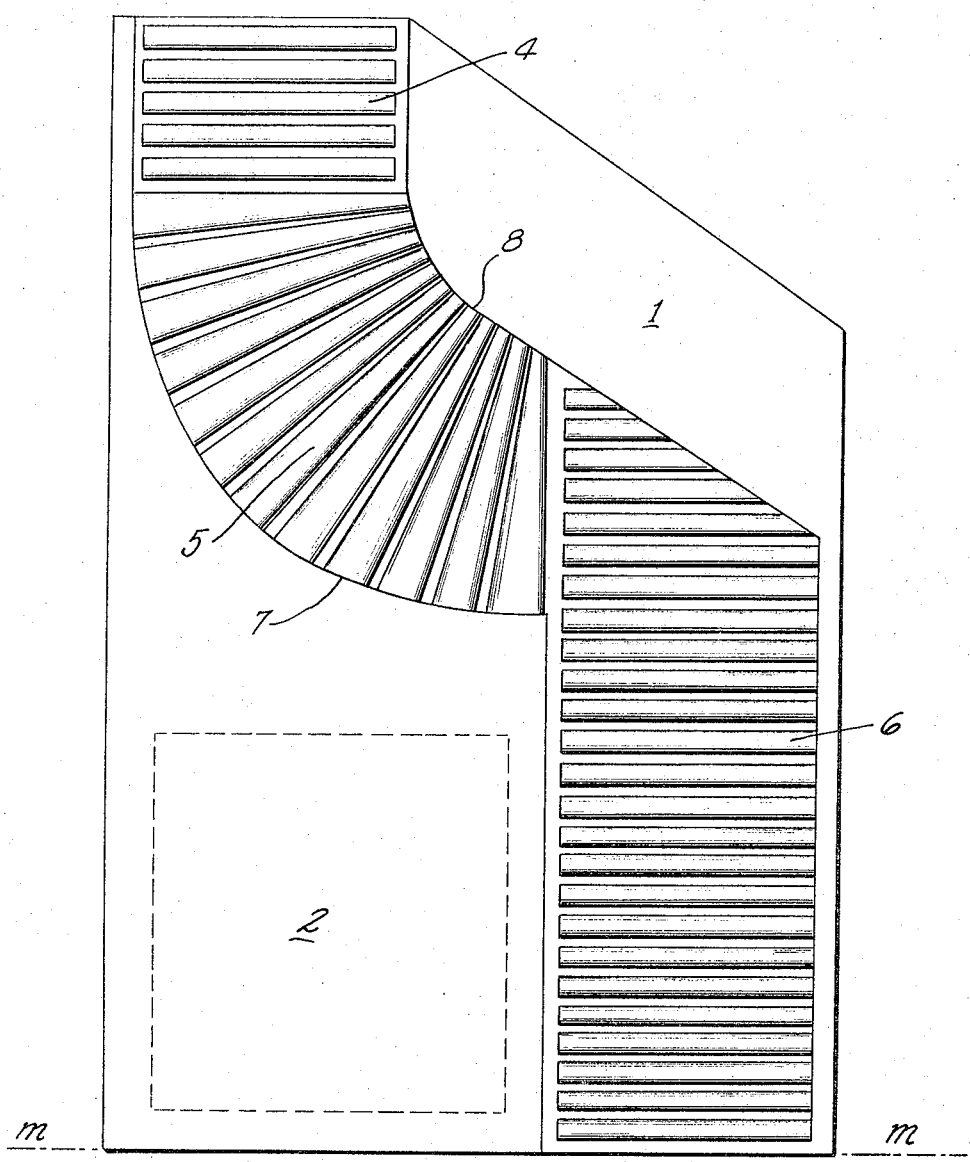

Further objects and features of the invention will become apparent from the following description of preferred embodiments which are schematically shown in the drawings in which FIG. 1 shows a schematic plan view of a truck train according to the invention and comprising a drive vehicle and several trailer carriages, FIG. 2 shows a schematic plan view of the arrangement of rollers provided on the loading surface of the drive vehicle, FIG. 3 shows schematically a plan view of the roller arrangement on the loading surface of a trailer carriage, FIG. 4 shows a schematic side view of a truck train according to the invention with some parts of the side walls broken away.

The truck train shown in FIG. 1 consists of a drive vehicle 1 which pulls the individual trailer carriages 3. On the drive vehicle 1 there is provided a driver's seat 2. The carloads to be conveyed may be placed onto the loading section of the drive vehicle which is shown at the left side of FIG. 1. They travel firstly over the drive vehicle and then over the subsequent trailer carriages until they are halted either by an abutment at the rear side of the last carriage or by a preceding carload.

FIG. 2 shows the arrangement of the conveying rollers on the drive vehicle. The goods or carloads to be conveyed are taken over by rollers 4 all of which are formed cylindrically and rotating with one and the same speed. These rollers are driven by a chain and sprockets from a common motor. In continuation of the conveying path formed by the rollers 4 and arcuate roller system 5 is provided and ararnged in fan-like pattern over an angle of about 90°. These rollers 5 are conically shaped i.e. they are tapering towards the inside. The axes of all the rollers 5 are intersecting in one and the same point. These rollers are also rotating at one and the same speed and may be driven from the same motor as the rollers 4.

The actual roller path is formed by cylindrical rollers 6 which are also commonly driven over sprockets connected by a chain. The sprockets, however, are preferably having unlike diameters that the speeds of the rollers decrease towards the rear end of the drive vehicle. The device is preferably adjusted so that the last rollers are rotating with the same speed as the rollers on the loading surfaces of the trailer carriages.

The whole roller system of the drive vehicle is accommodated in a common frame which is preferably pivotable bewteen certain limits upwardly and downwardly about the axis $m$—$m$. This serves to adapt the level of the receiving rollers 4 to different levels of various loading means.

The mode of operation of the conveying roller system of the drive vehicle is as follows:

A loading device places the goods, for instance carloads, suitcases and the like, approximately longitudinally on the rollers 4. These rollers are moving the goods from the front end towards the rear end of the vehicle. During this movement, the goods are rotated by the common action of the conical roller system 5 and a baffle 7 about an angle of approximately 90° C. From this roller system 5, the goods are transferred to the rollers 6 which convey them further with continuously decreasing speed onto the trailer carriage where they arrive in an approximately transverse position. Thereafter the rollers of the trailer carriages take over the further conveyance of the goods. There is no exact transverse position obtained wih this arrangement nor is this desired because goods arranged obliquely are less tending to dump than those that are arranged transversely. When the goods are shifted together at the end of the conveying path, they are turned to exact transverse positions by the action of the two independent sets of rollers 9 on the loading surfaces of the trailer carriages.

The unloading of the goods is effected vice versa: The carload is brought onto the roller path 6 from the first trailer carriage 3 and is, due to the different speed of the rollers of this roller path, conveyed somewhat faster than the subsequent carload. The carload abuts against a baffle 8, turns about approximately 45° and is pushed to the left onto the conical rollers 5 which continue the turning movement and move the carload with an approximately longitudinal position onto the rollers 4. Here the carload may be unloaded either manually or pushed onto an outer conveying device.

The drive vehicle is equipped with known per se steering and control means. For example, the control means for the conveying rollers by which the conveying direction, the roller speed, the stoppage of a roller path etc. can be selected, may be accommodated near the driver's seat. This control equipment may also be provided twofold, the second one being arranged in a switch cabinet mounted at the end of a loose cable and arranged for actuation by either hand or foot. By means of this control cabinet, the conveying device on the truck train may be controlled remotely from the train.

FIG. 3 shows a schematic plan view of one of the trailer carriages. Each carriage contains a transport path formed of rollers 9, with every two rollers being axially aligned so that a left-hand and a right-hand roller set are provided on the carriage. The rollers of both sets extend as far as to the middle of the carriage. At their outer ends, the rollers are each carrying a sprocket 10 which is driven by a chain 11. An overload coupling 12 is provided between the sprocket 10 and the roller 9, for instance in the form of a slip coupling, which adjustably limits the transferred torque. This arrangement serves for two purposes: Should a load be arranged obliquely when reaching the final position, it will be moved to a transverse position because the overload clutch of the roller on the side on which the container has already been halted and lies close to the preceding container will disengage while the associated rollers on the other side will continue to rotate and shift the other part of the carload into abutment with the preceding carload which has already come to rest. It is also possible to switch off the drive for any individual carriage by means of a control device arranged near the driver's seat. At the rear end of each carriage a barrier 12 is pivotally provided by which the conveying path of the last truck may be closed; in the preceding carriages, this barrier is swung close to the side walls 13. These side walls prevent lateral movement of the carloads. The front ends of the carriages are of slight convex shape; the rear ends are straight. In the convex parts of the front ends of the carriages an idler roller 14 is provided which serves to compensate for different conveying speeds of two subsequent carriages in case these speeds should not be exactly equal.

In the design of a truck train, it is most convenient to supply all electric drives from a 30 volts D.C. generator. The drive motors may be 28 volts D.C. shunt motors. For starting the internal combustion engine, a 24 volts battery may be provided. The connection of the electric motors of the roller conveyors of individual carriages to the generator arranged on the drive vehicle is effected by multiple strand cables which are provided with plug-in type couplings between the vehicles. The control lines which terminate in the control device near the driver's seat or in the actuating device connected in parallel to this control device, are also contained in this cable.

FIG. 4 shows schematically a side view of an embodiment of the invention. The top plan view of this embodiment corresponds to FIGS. 2 and 3. As shown, the drive vehicle 1 comprises a first loading surface 21, a driver's seat 2 near a steering device 22, control means 23 which allow for independent control of all driving equipment and a vehicle body 24 which contains all the necessary drive means. In the loading surface 21, a first roller conveyor comprising rollers 4, 5 and 6 is provided. The rollers are commonly driven by a chain and sprocket drive 25 from a first electric motor 26 arranged in the interior of the vehicle body 24. The rear wheels 27 of the drive vehicle are driven by a drive motor which may also be an electric motor 28. The front wheels 29 need not to be driven but are connected to the steering device 22. The interior of the vehicle body 24 also contains an internal combustion engine 30 driving a D.C. generator 31 which serves as a power source for all drive means of the train. This generator may also be connected to a storage battery (not shown). The engine 30 may be started by a usual D.C. starter motor (not shown) and is controlled in the usual manner by suitable devices of the control means 23. The first electric motor 26 and the motor 28 are connected to the generator 31 via the control means 23.

A first trailer carriage 3 is coupled to the drive vehicle by means of a coupling 32 and comprises a second loading surface 33 and a carriage body 34 provided with wheels 35 and side walls 36 extending beyond the loading surface 33 to prevent excessive lateral movement of a carload 37. The second loading surface 33 is formed of a second roller conveyor comprising parallel rollers 38 which may be arranged in two sets as shown in FIG. 3. Ahead of the rollers 38, in the front section 39 of the carriage 3, an idler roller 39 is provided.

The two sets of rollers 38 are driven each from an electric motor 40, 42 via a chain and sprocket drive. Only the chain and sprocket drive 41 of one set of rollers 38 is shown in FIG. 4. The two motors 40, 42 form second motor means for actuating the second roller conveyor forming the second loading surface 33. The power for the second motor means 40, 42 is supplied via a power connection means 43 which consists of a multiple contact plug connection of multiple strand cables which may also contain signal and control leads. The trailer carriages 3 are provided with further coupling and power connection means 44 at their rear ends to make possible the connection of further trailer carriages. The drive vehicle 1 may be equipped with lifting devices (not shown) which allow for pivotal movement of the first loading surface 21 about an axis $m$ at the rear end of the drive vehicle 1.

What I claim is:

1. A truck train comprising a drive vehicle and at least one trailer carriage connected to said drive vehicle by coupling means, said drive vehicle having a first loading surface extending over substantially the whole length of said drive vehicle and having a leading section, drive means for driving said drive vehicle, steering means for steering said drive vehicle, a first roller conveyor provided in said first loading surface and adapted to convey carloads in the direction of the train length, first motor means for actuating said first roller conveyor, power connection means interposed between said drive vehicle and said trailer carriage, a power source supplying said power connection means, and control means to independently control said power source, said drive means and said first motor means, said trailer carriage having a second loading surface located at substantially the same level as said first loading surface of said drive vehicle and extending over substantially the whole length of said trailer carriage, a second roller conveyor provided in said second loading surface and adapted to convey carloads in the direction of the train length, second motor means for actuating said second roller conveyor and connected to said power connection means, and further coupling and power connection means adapted to connect a further trailer carriage, said first roller conveyor comprising a number of cylindrical rollers arranged in parallel in the leading section of said first loading surface, a group of frustro-conical rollers arranged in a fan-like pattern to form an arcuate conveying path extending from the end of said group of cylindrical rollers over an angle of about 90 degrees, and further cylindrical rollers arranged in parallel in the rear section of said first loading surface beginning adjacent the rear end of said arcuate conveying path, said second roller conveyor comprising two parallel sets of parallel rollers forming two independent conveyor tracks on both sides of said second loading surface, and an idler roller arranged ahead of the said two sets of parallel rollers in the leading section of said second loading surface, said first and second loading surfaces forming together an elongated common loading and conveying path extending in the direction of the train length and adapted to convey carloads under control of said control means independently of the movement of said truck train so that, with the said roller conveyors actuated, any carload placed upon said first number of cylindrical rollers can be conveyed over said first number of cylindrical rollers, said group of frustro-conical rollers, said further cylindrical rollers, said idler roller and said sets of parallel rollers to the rear end of said trailer carriage and upon reversing the conveying direction by means of said control means, also back to said leading section of said first loading surface on said drive vehicle.

2. A truck train according to claim 1, wherein said second motor means is adapted to separately actuate said two parallel sets of parallel rollers under control of said control means.

3. A truck train according to claim 1, wherein an overload clutch is inserted between each roller of the said two parallel sets of parallel rollers and the said second motor means, said overload clutch being adapted to disengage if the transmitted torque exceeds a predetermined value.

4. A truck train comprising a drive vehicle and at least one trailer carriage connected to said drive vehicle by coupling means, said drive vehicle having a first loading surface extending over substantially the whole length of said drive vehicle and having a leading section, drive means for driving said drive vehicle, steering means for steering said drive vehicle, a first roller conveyor provided in said first loading surface and adapted to convey carloads in the direction of the train length, first motor means for actuating said first roller conveyor, power connection means interposed between said drive vehicle and said trailer carriage, a power source supplying said power connection means, and control means to independently control said power source, said drive means and said first motor means, said trailer carriage having a second loading surface located at substantially the same level as said first loading surface of said drive vehicle and extending over substantially the whole length of said trailer carriage, a second roller conveyor provided in said second loading surface and adapted to convey carloads in the direction of the train length, second motor means for actuating said second roller conveyor and connected to said power connection means, and further coupling and power connection means adapted to connect a further trailer carriage, said second roller conveyor comprising two parallel sets of parallel rollers forming two independent conveyor tracks on both sides of said second loading surface, said second motor means comprising separate motors drivingly connected to each of said parallel sets of parallel rollers, a slip clutch associated with each roller interposed between the associated roller and its driving connection, and an idler roller arranged ahead of the said two sets of parallel rollers in the leading section of said second loading surface, said first and second loading surfaces forming together an elongated common loading and conveying path extending in the direction of the train length and adapted to convey carloads under control of said control means independently of the movement of said truck train so that, with the said roller conveyors actuated, any carload placed upon said first loading surface can be conveyed over said idler roller and said sets of parallel rollers to the rear end of said trailer carriage and upon reversing the conveying direction by means of said control means, also back to said leading section of said first loading surface on said drive vehicle.

References Cited by the Examiner
UNITED STATES PATENTS 2,346,659    4/1944    Bruce _____ 198—92
2,420,009    5/1947    Osgood _____ 198—92 X GERALD M. FORLENZA, *Primary Examiner.*

ROBERT G. SHERIDAN, *Examiner.*